(12) United States Patent
Chmielewski et al.

(10) Patent No.: US 8,359,831 B2
(45) Date of Patent: Jan. 29, 2013

(54) REACTANT DELIVERY FOR ENGINE EXHAUST GAS TREATMENT (75) Inventors: Thaddeus A. Chmielewski, Huntington Woods, MI (US); Antonio J. DaSilva, Middleton, CT (US); David H. Ford, Canton, MI (US); Eric J. Grant, Ypsilanti, MI (US); Peter P. Kuperus, Pigeon, MI (US); Glenn A. Moss, Cass City, MI (US); Joseph M. Ross, Greenville, TN (US)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 412 days.

(21) Appl. No.: 12/608,408

(22) Filed: Oct. 29, 2009

(65) Prior Publication Data
US 2010/0107615 A1 May 6, 2010

Related U.S. Application Data (60) Provisional application No. 61/170,422, filed on Apr. 17, 2009, provisional application No. 61/110,383, filed on Oct. 31, 2008.

(51) Int. Cl.
F01N 3/36 (2006.01)
(52) U.S. Cl. ............................................ 60/286; 60/295
(58) Field of Classification Search .................. 60/286, 60/295; 137/563, 565.35; 222/146.5, 318
See application file for complete search history.

(56) References Cited

U.S. PATENT DOCUMENTS

| 2,970,548 A | 2/1961 | Berner |
| 2,996,994 A | 8/1961 | Wright |
| 3,205,827 A | 9/1965 | Zimmermann |
| 3,223,043 A | 12/1965 | Shapiro |
| 3,238,883 A | 3/1966 | Martin |
| 3,420,184 A | 1/1969 | Englesberg et al. |
| 3,470,824 A | 10/1969 | O'Connor |
| 4,526,518 A | 7/1985 | Wiernicki |
| 5,884,475 A | 3/1999 | Hofmann et al. |

(Continued)

FOREIGN PATENT DOCUMENTS

| DE | 202007006636 U1 | 7/2007 |
| DE | 102007047885 A1 | 6/2008 |

(Continued)

OTHER PUBLICATIONS

Scarnegie; Brian, et al., Recent DPF/SCR Results Targeting US2007 and Euro 4/5 HD Emissions, SAE Technical Paper Series, Mar. 3-6, 2003, 13 pages, 2003-1-0774, 2003 SAE World Congress, Detroit, Michigan.

(Continued)

Primary Examiner — Kenneth Bomberg
Assistant Examiner — Jorge Leon, Jr.
(74) Attorney, Agent, or Firm — Reising Ethington P.C.

(57) ABSTRACT

A reactant delivery system for engine exhaust gas treatment may include a tank in which a reactant is received, a pumping device, a pressure relief device, and a reactant distribution device. The pumping device may have an inlet disposed within the interior of the tank to receive the reactant, and an outlet through which the reactant is discharged. The pressure relief device may have an inlet in fluid communication with the outlet of the pumping device, a primary outlet to discharge the reactant under pressure to a downstream location, and a bypass outlet through which at least some of the reactant discharged from the pumping device is selectively discharged. And the reactant distribution device may be in fluid communication with the bypass outlet of the pressure relief device and have a plurality of outlets to distribute the reactant to at least two different locations within the tank.

10 Claims, 8 Drawing Sheets

U.S. PATENT DOCUMENTS

| | | | |
|---|---|---|---|
| 5,976,475 | A | 11/1999 | Peter-Hoblyn et al. |
| 6,063,350 | A | 5/2000 | Tarabulski et al. |
| 6,139,289 | A | 10/2000 | Obata et al. |
| 6,216,675 | B1* | 4/2001 | Bennett .................. 123/541 |
| 6,442,932 | B1 | 9/2002 | Hofmann et al. |
| 6,539,708 | B1* | 4/2003 | Hofmann et al. ............ 60/286 |
| 6,810,661 | B2 | 11/2004 | Lambert et al. |
| 6,941,746 | B2 | 9/2005 | Tarabulski |
| 7,100,367 | B2 | 9/2006 | Schaller et al. |
| 7,449,162 | B2 | 11/2008 | Schaller et al. |
| 7,578,321 | B2 | 8/2009 | Levin |
| 7,836,684 | B2 | 11/2010 | Starck et al. |
| 7,895,829 | B2* | 3/2011 | Suzuki et al. ............... 60/286 |
| 2003/0145580 | A1* | 8/2003 | Ripper et al. ............... 60/286 |
| 2004/0083723 | A1* | 5/2004 | Hager et al. ................ 60/286 |
| 2005/0022515 | A1 | 2/2005 | Stiermann |
| 2007/0035832 | A1 | 2/2007 | Hirata et al. |
| 2007/0048204 | A1 | 3/2007 | Mital |
| 2007/0079599 | A1* | 4/2007 | Osaku et al. ............... 60/283 |
| 2007/0119153 | A1* | 5/2007 | Pierz et al. ................ 60/286 |
| 2007/0157602 | A1 | 7/2007 | Gschwind |
| 2007/0163240 | A1* | 7/2007 | Nishina et al. ............. 60/286 |
| 2007/0180816 | A1 | 8/2007 | Masuda et al. |
| 2007/0202019 | A1 | 8/2007 | Nishina et al. |
| 2007/0240405 | A1 | 10/2007 | Nishina et al. |
| 2008/0148717 | A1* | 6/2008 | Ohshima et al. ............ 60/295 |
| 2009/0100824 | A1* | 4/2009 | Starck et al. .............. 60/286 |
| 2009/0230136 | A1 | 9/2009 | Dougnier et al. |
| 2009/0255232 | A1* | 10/2009 | Barcin ...................... 60/274 |

FOREIGN PATENT DOCUMENTS

| | | |
|---|---|---|
| EP | 1605156 A1 | 12/2005 |
| EP | 1698769 A2 | 6/2006 |
| JP | 09303254 | 11/1997 |
| JP | 2003269275 | 9/2003 |
| JP | 2008101564 | 5/2008 |
| KR | 20020055630 | 7/2002 |
| WO | WO9843732 | 10/1998 |
| WO | WO2004042208 | 5/2004 |
| WO | WO2006131201 A2 | 12/2006 |
| WO | WO2007031467 A2 | 3/2007 |
| WO | WO2007141312 A1 | 12/2007 |
| WO | WO2008058977 A1 | 5/2008 |
| WO | WO2008138960 A1 | 11/2008 |
| WO | WO2009007405 | 1/2009 |

OTHER PUBLICATIONS

Seher; Dieter H. E., et al., Control Strategy for NOx-Emission Reduction with SCR, SAE Technical Paper Series, Nov. 10-12, 2003, 7 pages, 2003-01-3362, 2003 SAE International Truck and Bus, Fort Worth, Texas.

Conway; Ray, et al., Combined SCR and DPF Technology for Heavy Duty Diesel Retrofit, SAE Technical Paper Series, Apr. 11-14, 2005, 18 pages, 2005-01-1862, 2005 SAE World Congress, Detroit, Michigan.

European Search Report, Jul. 26, 2010 (5 pages).

* cited by examiner

REACTANT DELIVERY FOR ENGINE EXHAUST GAS TREATMENT

REFERENCE TO CO-PENDING APPLICATIONS

This application claims the benefit of, and incorporates by reference in its entirety, U.S. Provisional Application Ser. No. 61/170,422 filed Apr. 17, 2009 and U.S. Provisional Application Ser. No. 61/110,383 filed Oct. 31, 2008.

TECHNICAL FIELD

The present disclosure relates generally to reactant delivery systems and apparatus used for treatment of exhaust gas from combustion engines.

BACKGROUND

Selective catalytic reduction (SCR) systems are increasingly used to reduce nitrogen oxides present in exhaust gas from internal combustion engines and particularly diesel engines. SCR systems store an SCR reactant in a liquid or solid state. The SCR reactant typically includes a combination of urea —$(NH_2)_2CO$— and water. An exemplary SCR reactant is ADBLUE, which is the registered trademark held by the German Association of Automobile Industry for an aqueous urea solution. The SCR reactant is delivered into a flow of exhaust gas downstream of an engine and upstream of one or more catalytic converters. A typical SCR system includes a selective discharge catalyst in an exhaust system, an injector to provide doses of the SCR reactant to the downstream catalyst, and an SCR reactant delivery system.

The SCR reactant delivery system includes a tank defining a main volume for the SCR reactant, and a reservoir structure disposed in the main volume of the tank and defining a cold start volume of the SCR reactant. Because the SCR reactant will freeze in some conditions, a volume of the frozen SCR reactant inside the reservoir structure is heated so as to melt the frozen SCR reactant to provide SCR for operating the engine in cold weather conditions. Current United States' Federal Regulations require the SCR reactant to be supplied to the exhaust flow within twenty minutes of cold engine startup in cold weather conditions of at least −40 degrees centigrade.

SUMMARY OF THE DISCLOSURE

A reactant delivery system for engine exhaust gas treatment may include a tank in which a reactant is received, a pumping device, a pressure relief device, and a reactant distribution device. The pumping device may have an inlet disposed within the interior of the tank to receive the reactant, and an outlet through which the reactant is discharged. The pressure relief device may have an inlet in fluid communication with the outlet of the pumping device, a primary outlet to discharge the reactant under pressure to a downstream location, and a bypass outlet through which at least some of the reactant discharged from the pumping device is selectively discharged. And the reactant distribution device may be in fluid communication with the bypass outlet of the pressure relief device and have a plurality of outlets to distribute the reactant to at least two different locations within the tank.

In at least one implementation, a reactant delivery module for a reactant delivery system having a storage tank in which a supply of reactant is maintained may include a mounting flange formed of a thermally conductive material and having a sealing surface adapted to be coupled to the storage tank, a reactant delivery device carried by the mounting flange and within the storage tank, and an electrical connection coupled to the flange to provide electrical power which increases the temperature of the flange. When the flange is in contact with frozen reactant within the storage tank, the increased temperature of the flange helps to melt the frozen reactant.

In at least one implementation, a SCR reactant delivery system for engine exhaust gas treatment may include a tank, a motorized pumping device having an inlet, an absorbent filter coupled to the inlet of the pumping device to absorb and filter SCR reactant for delivery to the pumping device, and a heater extending adjacent the pumping device and the absorbent filter.

In at least one implementation, a motorized pumping device may include a housing including an axially extending outer wall at least partially defining a housing interior, and a dividing wall to divide the housing interior into a motor chamber wall on one side of the dividing wall and a pump chamber on the other side of the dividing wall. A motor may be carried in the motor chamber of the housing, and a first magnetic disc coupling member may be disposed in the motor chamber and structurally coupled to the motor. A pump assembly may be carried in the pump chamber of the housing and include a pump assembly case including an outer wall in contact with the housing, a pump carried by the pump assembly case and including a pump body defining a pump pocket, a pump port plate disposed against the pump body, a driven rotor disposed in the pump pocket between the pump port plate and the pump body, and a drive rotor disposed in the driven rotor between the pump body and the pump port plate. A second magnetic disc coupling member may be disposed in the pump chamber and operatively coupled to the first magnetic disc coupling member through the dividing wall and structurally coupled to the drive rotor through the pump port plate. A stationary shaft may be fixed to the pump body and extend through the pump drive rotor, and may be coupled to the second magnetic disc coupling member to allow rotation thereof about the shaft.

In at least one implementation, a motorized pumping device may include a housing including a motor chamber and a pump chamber, and a dividing wall between the motor chamber and the pump chamber. A motor may be disposed in the motor chamber, and a first magnetic coupling member may be disposed in the motor chamber on one side of the dividing wall and structurally coupled to the motor. A pump assembly may be disposed in the pump chamber and include a pump body and a drive rotor, a second magnetic coupling member disposed in the pump chamber on another side of the dividing wall and structurally coupled to the drive rotor and operatively coupled to the first magnetic coupling member through the dividing wall, a center support disposed between the second magnetic coupling member and the pump body and including a hub carrying a bearing, and a shaft coupled to the second magnetic coupling member, extending through the center support and bearing, and coupled to the drive rotor.

DETAILED DESCRIPTION OF PREFERRED EMBODIMENTS

Exemplary SCR System

Figure 1:
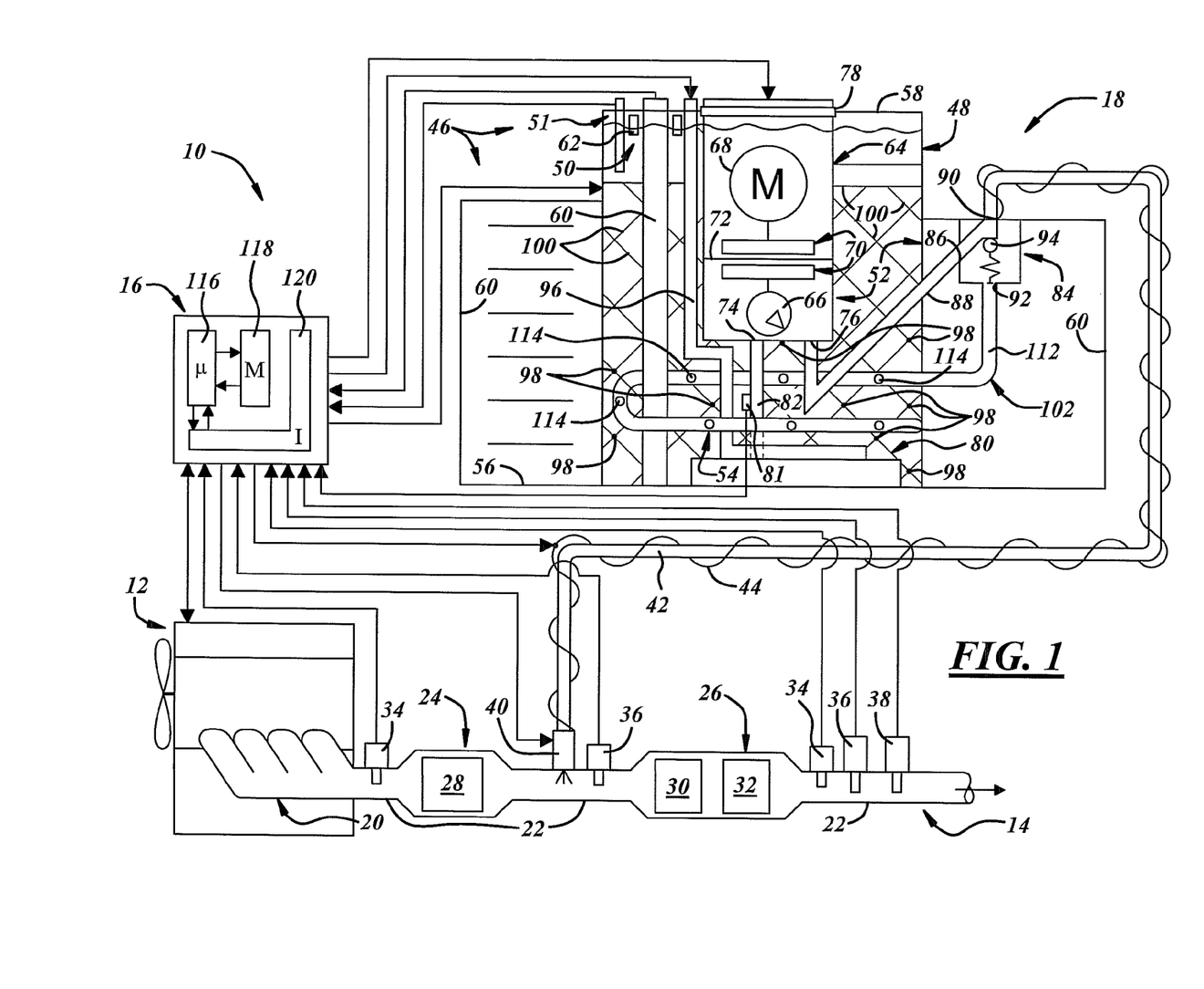
FIG. 1 is a block diagram of an exemplary form of an SCR reactant delivery system that is used in treating exhaust gas from an internal combustion engine.

Referring in more detail to the drawings, FIG. 1 illustrates an exemplary internal combustion engine system 10 including an engine 12, an exhaust system 14 coupled in fluid communication to the engine 12, and a controller 16 to control the engine 12 and the exhaust system 14. The system 10 may also include an SCR reactant delivery system 18 which may be considered part of the exhaust system 14. Portions of the delivery system 18 are also shown for general reference in FIGS. 2 and 3. As will be described in greater detail herein below, the delivery system 18 is capable of thawing frozen solid SCR reactant into liquid form and delivering the liquid SCR reactant to another portion of the exhaust system 14.

The engine 12 converts chemical energy into mechanical energy by combustion of air and fuel and may be of any suitable construction and composition. For example, the engine 12 may be a gasoline, diesel, or any other suitable type of engine that uses any appropriate thermodynamic cycle for combustion. The combustion yields a byproduct of exhaust gas, which is delivered downstream of the engine 12 by an exhaust manifold 20 of the engine 12. The exhaust manifold 20 is coupled in any suitable manner to the exhaust system 14.

The exhaust system 14 is coupled to the exhaust manifold 20 to receive the exhaust gases from the engine 12, treat the exhaust gases to remove or reduce pollutants, and convey the treated exhaust gases downstream to the atmosphere. The exhaust system 14 includes a conduit 22 that may be coupled to the exhaust manifold 20 of the engine 12, and catalytic converters 24, 26 in fluid communication with the conduit 22. For example, the catalytic converters may include an oxidation converter 24 and a nitrous oxide converter 26. The oxidation converter 24 may include any appropriate type of oxidation catalyst 28, and the nitrous oxide converter 26 may include any suitable SCR catalyst 30 and any appropriate $NH_3$ blocking catalyst 32.

The exhaust system 14 may also include various other devices to sense conditions or treat gases within the conduit 22. For example, temperature sensors 34 may be disposed upstream of the oxidation converter 24 and downstream of the nitrous oxide converter 26. In another example, NOx sensors 36 may be placed upstream and downstream of the nitrous oxide converter 26. In a further example, an $NH_3$ sensor 38 may be placed downstream of the nitrous oxide converter 26.

The exhaust system 14 also includes an SCR reactant injector 40 in fluid communication with the conduit 22 downstream of the oxidation converter 24 and upstream of the nitrous oxide converter 26. The injector 40 may be supplied with Liquid SCR reactant via the delivery system 18, which may include an SCR reactant line 42, which may be heated with any suitable heating device 44. For example, the heating device 44 may be an electrical resistance heating element, which may be coupled to and controlled by the controller 16.

The SCR reactant line 42 is coupled to a tank assembly 46, which generally includes a tank 48 to contain the SCR reactant, a level sensing device 50 to sense the level of SCR reactant contained in the tank 48, one or more temperature sensors 51 (one shown) to sense temperature inside the tank 48, a pressurizing apparatus 52 to pressurize the SCR reactant for delivery to the exhaust conduit 22, and a thawing apparatus 54 to thaw frozen SCR reactant to liquid form.

The tank 48 defines an internal volume for the SCR reactant and may be of any appropriate construction and composition. For example, the tank 48 may have a lower wall 56 and an upper wall 58 and sidewalls 60 therebetween to define the internal volume. The tank 48 may be composed of metal, plastic, or any other material suitable to contain the SCR reactant, which, for example, may include an SCR reactant such as a urea and water mixture or solution.

The level sensing device 50 senses the level of SCR reactant in the tank 48 and is coupled to the controller 16 to communicate the sensed SCR reactant level thereto, and may be of any suitable construction and composition. For example, the level sensing device 50 may include a stator 62 and a floatable armature 65 movable along the stator 60 to indicate the level of SCR reactant. In another embodiment, the level sensing device 50 may be a single point level sensor to indicate a low level condition, and/or may be a continuous and motionless type of level sensing device. The level sensing device 50 also or instead may include other devices to measure solid or frozen SCR reactant such as radio frequency sensors, thermistors, infrared sensors, or the like.

The temperature sensor 51 senses temperature of SCR reactant inside the tank 48 and the sensed temperature may be used as an input to the controller 16. For example, the controller 16 may use the sensed temperature from the sensor 51 in switching between the primary heater 96 and the secondary heaters 98. The sensor(s) 51 may be provided in any suitable quantity and location in the tank 48.

The pressurizing apparatus 52 extracts liquid SCR reactant from inside the tank 48, pressurizes the extracted liquid SCR reactant, and discharges the pressurized liquid SCR reactant for delivery outside of the tank 48. The apparatus 52 may be of any appropriate construction and composition and, for example, the apparatus 52 may include a motorized pumping device 64.

The motorized pumping device 64 may include a pump 66 to pressurize the liquid SCR reactant, a motor 68 coupled to the pump 66 to drive the pump 66 via a magnetic coupling 70 across a dividing wall 72, an inlet 74 through which liquid SCR reactant is extracted from the inside of the tank 48 into the pump 66, and an outlet 76 to discharge pressurized liquid SCR reactant from the pump 66. The magnetic coupling 70 enables use of the dividing wall 72 to isolate the pump 66 from the motor 68 to protect the motor 68 from the liquid SCR reactant. The magnetic coupling 70 also permits the motor 68 to rotate even if the pump 66 is frozen and unmovable, for example, when the SCR reactant is frozen therein. The pumping device 64 may be capable of any suitable output, for example, about 20 to 40 liters/hour at about 2.5 to 7.5 bar and, more particularly about 30 l/h and about 5 bar. The pumping device 64 may be carried by the tank 48 in any appropriate manner, for example, by the upper wall 58 via an adapter flange 78 that may be coupled to both the pumping device 64 and the upper wall 58 of the tank 48. The pumping device 64 may be of any suitable design, for example, the exemplary designs described below with respect to FIGS. 5A through 7.

Also, the pressurizing apparatus 52 may include a sock or inlet filter 80 to protect the system 18 by preventing at least some contaminants from being extracted into the pump 66 and being delivered to the downstream injector 40. The inlet filter 80 is coupled in fluid communication to the inlet 74 of the pump 66 in any appropriate manner, for example, by an inlet conduit 82, and may be of any suitable construction and composition. For example, the inlet filter 80 may be composed of polyamide 6 or polyamide 6-6, polybutylene terephthalate, or the like. In another example, the inlet filter 80 may include STRATAPORE filtration media available from Cummins Filtration of Findlay, Ohio or Nashville, Tenn. In any case, the inlet filter 80 may be constructed and composed in such a manner as to absorb, wick, or otherwise attract and hold SCR reactant therein, and may include a five to fifteen micron filtering capability. Also, a sump temperature sensor 81 may be provided in proximity to the filter 80, for example, coupled in any suitable manner adjacent the conduit 82. The sensor 81 may be any suitable temperature switch with a desired setpoint.

Further, the pressurizing apparatus 52 may include a pressure relief device 84 to allow pressurized liquid SCR reactant to bypass the SCR reactant line 42 and flow back to the internal volume of the tank 48 when pressure in the SCR reactant line 42 is sufficiently high. The pressure relief device 84 is disposed within the tank 48 and is coupled in fluid communication to the pump 66 in any appropriate manner, and may be of any suitable construction and composition. The pressure relief device 84 may have an inlet 86 in fluid communication with the outlet 76 of the pumping device 64 via an outlet conduit 88 to receive pressurized liquid SCR reactant therefrom, a primary outlet 90 to discharge the liquid SCR reactant under pressure to a downstream location outside of the tank 48, and a bypass outlet 92 to discharge excess liquid SCR reactant under pressure inside the tank 48. For example, the device 84 may be a mechanical valving device including a valve 94 biased against a valve seat to a closed position and movable from its seat to an open position at a predetermined pressure or threshold to allow liquid SCR reactant under pressure to be exhausted back into the tank 48 instead of being discharged or delivered downstream to the SCR reactant line 42. In another embodiment, the pressure relief device 84 may also or instead include an electromechanical valving device of any appropriate type in communication with and controlled by the controller 16.

The SCR reactant thawing apparatus 54 thaws frozen SCR reactant in a selected volume within the internal volume of the tank 48. In other words, the apparatus 54 may selectively thaw frozen SCR reactant according to a given volume. The apparatus 54 may include a first heater 96 as a primary source of heat, one or more secondary heaters 98, which may be carried on a secondary heater carrier 100 disposed at least partially around at least portions of the pumping device 64 and filter 80, and a liquid SCR reactant distribution device 102 disposed in the tank 48 and coupled in fluid communication to the pressure relief device 84.

The first heater 96 heats frozen SCR reactant in a specified volume of the tank 48. For example, the first heater 96 may extend in close conforming relationship to the pumping device 64 and filter 80. For instance, the first heater 96 may extend in a longitudinal direction alongside or adjacent the level sensing device 50 and/or the pumping device 64 over a substantial portion of the lengths thereof, for example, over 50% of the lengths. The first heater 96 may also extend in a transverse direction alongside or adjacent a bottom portion of the pump 66, in a longitudinal direction alongside or adjacent the inlet conduit 82, and in a transverse direction alongside or adjacent an upper surface of the inlet filter 80. The first heater 96 is placed in such proximity to the filter 80 that heat flux from the heater 96 thaws to a liquid frozen SCR reactant in and/or adjacent the filter 80. Stated another way, the first heater 96 is placed close enough to the filter 80 to saturate the filter 80 with heat. The proximity of the heater 96 to the filter 80 is such that the heater 96 will not damage the filter 80 and for good heat flux to maximize melting of the SCR reactant in the vicinity. Also, the heater 96 may be equipped with thermal overprotection functionality to prevent damage to the filter 80 if the heater 96 is inadvertently supplied with excessive voltage, for example, full battery voltage at 12 Volts. The primary heater 96 may contact the filter 80 without damage thereto because of inherent temperature set point(s) of the heater 96. The filter material is rated for over 80 degrees centigrade and the heater 96 will self-regulate to shut off via the setpoint(s) at 50 degrees centigrade. The first heater 96 may be coupled to the controller 16 and may be an electrical resistance heating element of any suitable construction and composition. For example, the heater 96 may include one or more positive temperature coefficient (PTC) heating elements.

The secondary heater(s) 98 heat frozen SCR reactant in a generalized volume of the tank 48 in contrast to the first heater 96. The secondary heater(s) 98 may be coupled to the controller 16 and also may include electrical resistance heating elements of any appropriate quantity, construction, and materials. For example, and referring to FIGS. 4A and 4B, the secondary heaters 98 may include PTC elements 104 encapsulated in a phase-change material 106 (partially shown) and disposed within a housing 108. In one example, the housing 108 can be injection molded around the phase-change material 106 and PTC elements 104. The secondary heaters 98 may include one or more electrical leads 110 of any kind that may extend through the phase change material 106 and out of the housing 108, which may be molded around the lead(s) 110. The secondary heaters 98 may be of any suitable shape, for example, shark-tooth-shaped, and may be of any suitable size.

The secondary heater carrier 100 supports the secondary heaters 98 and allows substantially unrestricted flow around the inside of the tank 48, and may be of any appropriate construction and composition. For example, the carrier 100 may be a generally self-supporting or rigid cylindrical mesh structure composed of conductive and/or insulative material, for example, stainless steel, ceramic, or the like. The secondary heaters 98 may be carried on or coupled to the carrier 100 in any suitable manner, for example, via fastening, molding, adhering, or the like.

The liquid SCR reactant distribution device 102 selectively distributes overflow or bypass liquid SCR reactant from the pressure relief device 84 over a selected area or volume within the tank 48. For example, the device 102 may distribute bypass liquid SCR reactant between the specified and generalized volumes heated by the heaters 96, 98, and may be of any appropriate construction and composition. For instance, the device 102 may include a conduit 112 coupled in fluid communication to the bypass outlet 92 of the pressure relief device 84 and having a plurality of outlets 114 in various orientations to selectively distribute the bypass liquid SCR reactant within the tank 48.

The conduit 112 may be a flexible hose or a self-supporting or rigid tube or pipe and may be composed of any suitable material. The conduit 112 may be of any suitable shape and size, for example, loop-shaped, ring-shaped, helically-shaped, or the like at least within the confines of the carrier 100. In one or more implementations, the conduit 112 may be arranged in a non-linear and/or non-planar fashion within the tank, or it may be provided in a linear or substantially linear fashion. The outlets 114 may be orifices or apertures provided along the length of the conduit 112 and may be provided in any appropriate size, shape, and quantity to collectively present little to no backpressure to the pressure relief device 84 so that it does not substantially change a desired or predetermined pressure setpoint of the pressure relief device 84.

The apertures 114 may be positioned and directed so as to selectively distribute liquid SCR reactant in three planes or three dimensional space within the tank 48 in the vicinity of the filter 80 and pump 66. More specifically, for a given length of conduit 112, the total flow area through the apertures 114 may increase with distance from the pressure relief device 84 to achieve relatively consistent flow and/or pressure delivered by the conduit 112. This may be accomplished, for example, by increasing the size and/or quantity of the apertures 114 as the distance from the pressure relief device 84 increases. Also, at least some of the outlets 114 may be sized and located so as to direct liquid SCR reactant onto the filter 80, for example, to decontaminate the filter 80. The conduit 112 and its outlets 114 may be sized, oriented, and provided in a quantity to maximize distribution of liquid SCR reactant within the tank 48. The liquid SCR reactant distribution device 102 may also provide continuous and homogeneous flow of the liquid SCR reactant in the tank 48, for example, to promote miscibility or solubility of the mixture or solution.

In general, the controller 16 may receive and process input from the various system devices in light of stored instructions and/or data, and transmit output signals to the same and/or other system devices. The controller 16 may include, for example, an electrical circuit, an electronic circuit or chip, and/or a computing device. In the computing device embodiment, the controller 16 generally may include a processor 116, memory 118 that may be coupled to the processor 116, and one or more interfaces 120 coupling the processor 116 specifically and/or the controller 16 in general to one or more of the other system devices. Although not shown, the controller 16 and the other electrically powered system devices may be supplied with electricity by a power supply (not shown), for example, one or more batteries, fuel cells, or the like.

The processor 16 may execute instructions that provide at least some of the functionality for the system 10. As used herein, the term instructions may include, for example, control logic, computer software and/or firmware, programmable instructions, or other suitable instructions. The processor 16 may include, for example, one or more microprocessors, microcontrollers, application specific integrated circuits, and/or any other suitable type of processing device.

Also, the memory 118 may be configured to provide storage for data received by or loaded to the controller 16, and/or for processor-executable instructions. The data and/or instructions may be stored, for example, as look-up tables, formulas, algorithms, maps, models, and/or any other suitable format. The memory 118 may include, for example, RAM, ROM, EPROM, and/or any other suitable type of storage device.

Finally, the interface(s) 120 may include, for example, analog/digital or digital/analog converters, signal conditioners, amplifiers, filters, other electronic devices or software modules, and/or any other suitable interfaces. The interface (s) 120 may conform to, for example, RS-232, parallel, small computer system interface, universal serial bus, CAN, MOST, LIN, FlexRay, and/or any other suitable protocol(s). The interface(s) 120 may include circuits, software, firmware, or any other device to assist or enable the controller 16 in communicating with the other system devices.

In operation, the engine 12 may be shut down from a warm or hot operating condition in which liquid SCR reactant has already been flowing from the tank 48 to the injector 40 for some period of time. Upon engine shut down, the SCR reactant line 42 typically may be evacuated. For example, the pumping device 64 may be operated in reverse wherein the pump inlet and outlet are reversible. Accordingly, liquid SCR reactant is pulled through the SCR reactant line 42 from the injector 40 and into the tank 48 via the pump 66 and filter 80. More specifically, the controller 16 may reverse direction of rotation of the motor 68 of the pumping device 64 to draw liquid SCR reactant through the SCR reactant line 42, and may open the injector 40 simultaneously or shortly thereafter to allow the liquid SCR reactant to be evacuated. Accordingly, shortly after engine shutdown little to no liquid SCR reactant remains in the fluid path between the injector 40 and the pump inlet 74.

For engine startup in freezing weather conditions, the SCR reactant inside the tank 48 is frozen and cannot be immediately delivered to the exhaust conduit 22. However, within minutes the primary and/or secondary heaters 96, 98 will thaw the SCR reactant to a liquid in the vicinity of the inlet filter 80, inlet conduit 82 and pump 66, and the inlet filter 80 wicks more and more SCR reactant away from the frozen SCR reactant surrounding the filter 80, and the SCR reactant line heater 44 preheats the SCR reactant line 42. Current vehicle requirements mandate that the system must be fully functioning and able to deliver the SCR reactant continuously without interruption within 20 minutes from engine startup at −40 degrees centigrade. It is anticipated that one or more aspects of the present arrangement enables this vehicle requirement to at least be complied with, if not significantly exceeded.

In one embodiment, the secondary heaters 98 may be cycled on and off and/or operated according to zones. For example, the controller 16 may cycle all of the secondary heaters 98 in an on/off manner according to any suitable time, duration, duty cycle, or the like, which may be determined in response to, for example, one or more temperature readings from one or more of the temperature sensors 51. In another example, secondary heaters 98 may be defined in zones which include less than all of the heaters 98. For instance, a general zone may include a volume encompassed by the secondary heaters 98 but outside of a volume that receives full heat flux of the primary heater 96. Also, the general zone may be divided into a plurality of specific zones based on the heat flux produced by the secondary heaters 98 and the heat distribution of the SCR reactant distribution device 102. Those of ordinary skill in the art will appreciate that the quantity, size, and location of the zones may be application specific and may be determined using any suitable computer modeling and/or empirical testing for each specific application.

In one exemplary embodiment, the primary heater 96 is energized to melt the frozen solid SCR reactant into liquid SCR reactant for inlet into the pump 66 and until the output of the pump 66 supplies liquid SCR reactant to the distribution device 102 with at least a minimally acceptable amount of liquid SCR reactant flow that may be determined in any suitable manner.

The controller 16 may decrease the power supplied to the primary heater 96, and may energize or increase power delivered to one or more of the secondary heaters 98. One or both of the temperature sensors 51, 81 may be used as inputs to the controller 16 for controlling operation of the heaters 96, 98. For example, the primary heater 96 may be fully energized to thaw the frozen SCR reactant and may remain fully energized until the temperature switch 81 is tripped by an increase in temperature beyond its setpoint. At that point, the power supplied to the primary heater 96 power will start to be decreased at some desired rate and power supplied to the secondary heaters 98 will start to be increased. The full temperature range sensor 51 may then be used as input to the controller 16 to control the secondary heaters 98 as power to the primary heater 96 eventually decays to zero and full power is applied to the secondary heaters 98. When temperature readings from the temperature sensor 51 outside of the virtual sump area reach a predetermined level, the controller 16 will then decrease power supplied to the secondary heaters 98 to zero, for example, when the frozen SCR reactant is fully melted.

In a similar example, the power decreased from the primary heater 96 may be generally equal to the power increased to the secondary heaters 98. In another example, the primary heater 96 may be progressively deenergized as more and more of the secondary heaters 98 are progressively energized. One or both of the heaters 96, 98 may be energized until all of the SCR reactant in the tank 48 is in liquid form and reaches a desired temperature level.

One or more of the secondary heaters 98 may be energized at least until the phase change temperature of those secondary heaters 98 is reached. Thereafter, the one or more secondary heaters 98 may be deenergized and one or more others of the secondary heaters 98 may be energized at least until the phase change temperature of those other secondary heaters 98 is reached. This process may be repeated until all of the secondary heaters 98 have been fully energized at least once, and the process may continue to heat some or all of the secondary heaters 98 in any suitable manner. For example, the controller 16 may cycle the secondary heaters 98 of the various defined zones in any appropriate manner so as to reduce maximum current draw to comply with various vehicle requirements or for any other purpose. In one example, the secondary heaters 98 may be cycled on for one minute and off for five to six minutes. The selective cycling of the secondary heaters 98 may further enable efficient thawing of the frozen SCR reactant.

Figures 4A, 4B, 5B:
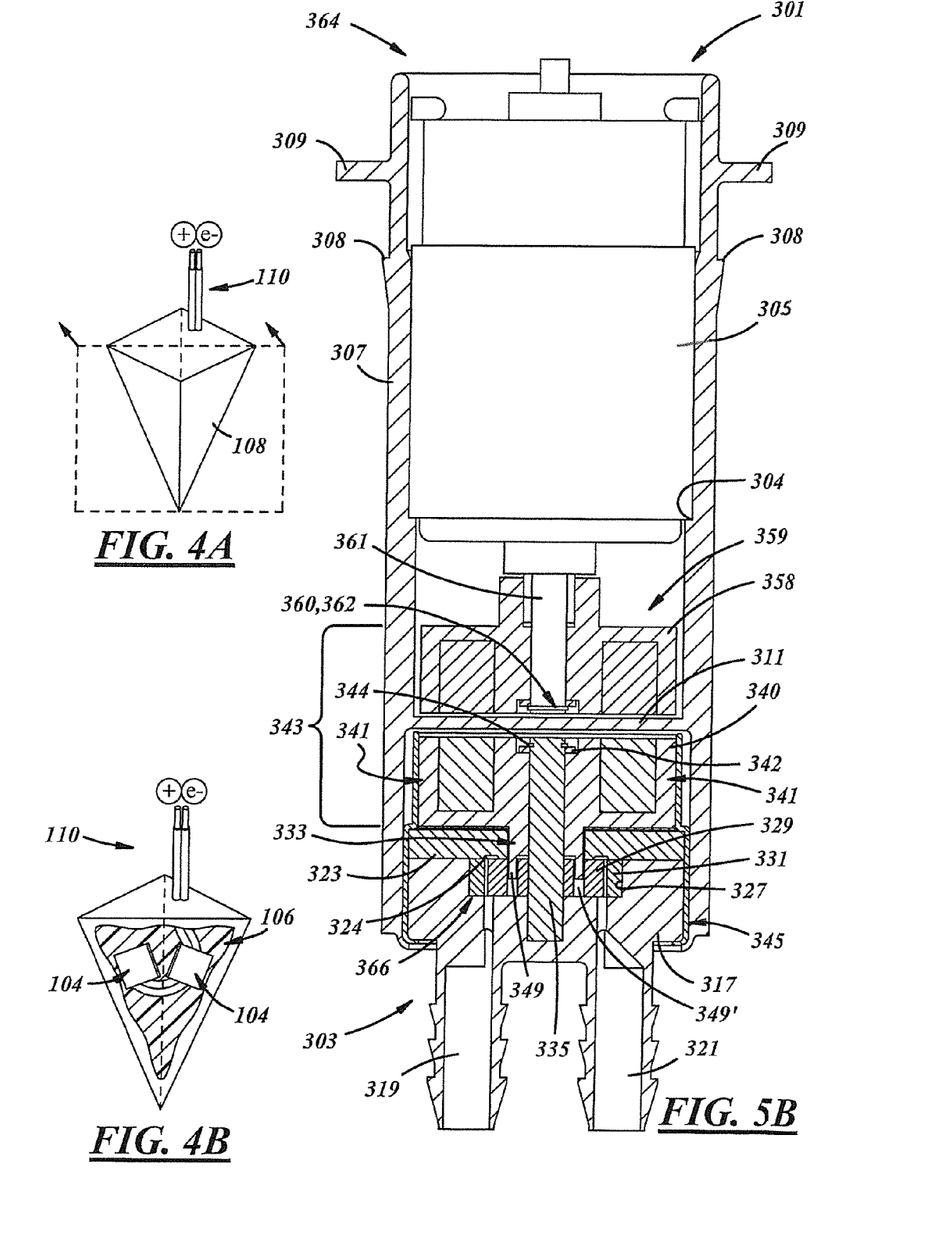
FIG. 4A is a fragmentary view of an exemplary form of a heating element for use in the system of FIG. 1.
FIG. 4B is a fragmentary view with a portion broken away of an exemplary form of a heating element for use in the system of FIG. 1.
FIG. 5B is a cross-sectional view of another exemplary form of a motorized pumping device for use in the system of FIG. 1.

Also, once the phase-change material 106 changes phase from a solid to a liquid from heating by the PTC element 104, the phase-change material in its liquid state retains heat after the PTC element 104 is deactivated and dissipates this heat more slowly than would the PTC element 104 acting alone. Therefore, the secondary heaters 98 provide a certain amount of thermal mass and momentum wherein they retain sufficient heat to remain at a temperature above freezing for a substantial period of time after being deenergized, for example on the order of about five to six minutes.

The controller 16 determines when the pumping device 64 can start operating in a suitable fashion without damage, cavitation, or the like. For example, within about six minutes from a −40 degrees centigrade condition, the pumping device 64 may start operating. Accordingly, the pump 66 may receive, pressurize, and discharge liquid SCR reactant to the emptied fluid path between the pump inlet 74 and the injector 40. At that time, the controller 16 may open the injector 40 to start SCR exhaust gas treatment, may maintain the injector 40 closed, or may cycle the injector 40 on and off according to any suitable duty cycle.

In any case, at least some liquid SCR reactant may be bypassed through the pressure relief device 84 and through the liquid SCR reactant distribution device 102. Therefore, relatively warm liquid SCR reactant is selectively distributed over the cold frozen SCR reactant in the tank 48 to accelerate thawing of the frozen SCR reactant and supplement and expedite the thawing effort of the heaters 96, 98. Thus, less power may be consumed to operate the heaters 96, 98 to thaw the frozen SCR reactant in the tank 48. In one example, the SCR reactant flowing through the SCR reactant distribution device 102 may reduce the time it takes for the system 18 to be up to 100% operating capacity.

A virtual sump may be defined by one or more of the first heater 96, the secondary heaters 98, the SCR reactant distribution device 102, and/or the absorbent inlet filter 80 to thaw a cold start volume of SCR reactant. As the frozen SCR reactant is melted by the primary heater 96 and the distribution device 102, liquid SCR reactant will be surrounded by frozen SCR reactant, thereby defining a liquid pocket of the SCR reactant in an ever increasing ice sump until all the frozen SCR reactant is melted. Accordingly, although a separate heated reservoir tank also could be used to thaw a cold start volume of SCR reactant defined by walls, such additional structure may be rendered unnecessary by the virtual sump.

Exemplary Pumping Devices

Figure 2:
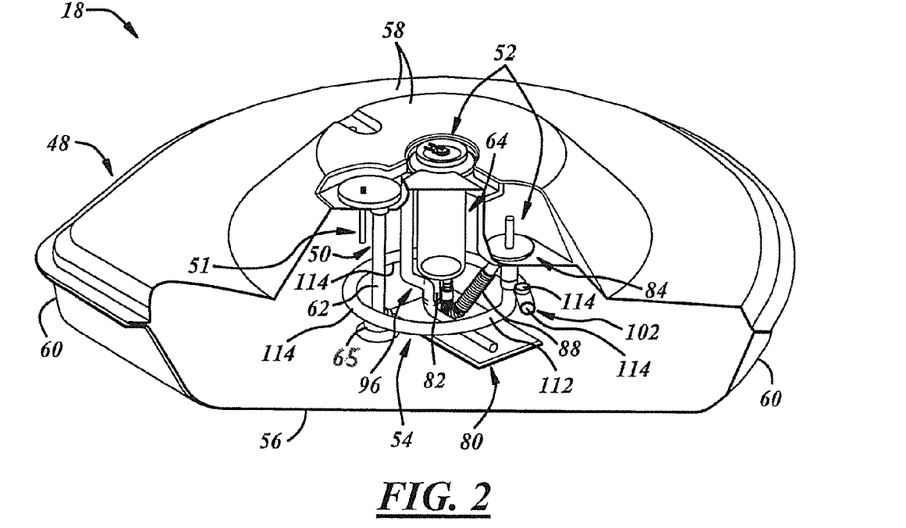
FIG. 2 is a perspective view of the SCR reactant delivery system of FIG. 1.
Figure 3:
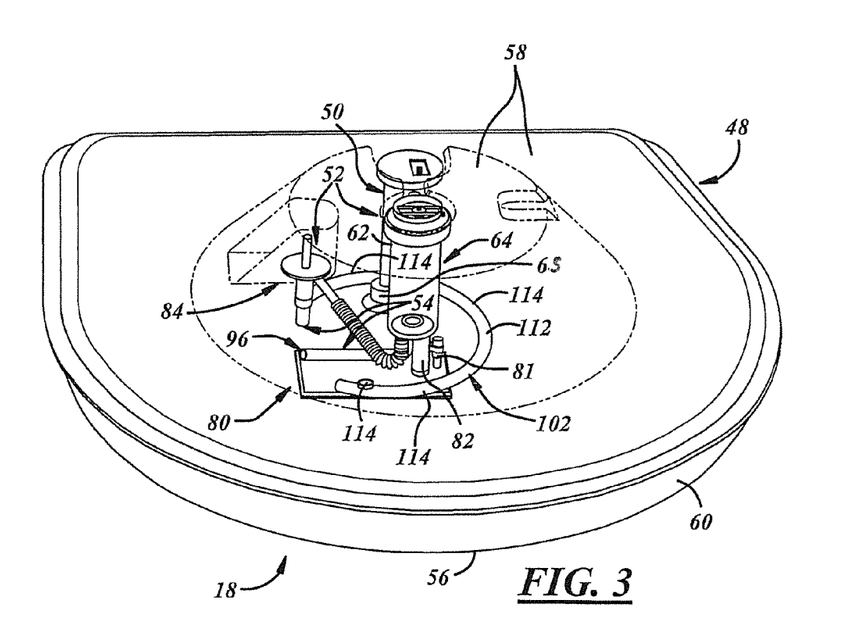
FIG. 3 is another perspective view of the SCR reactant delivery system of FIG. 1.

The motorized pumping device 64 of FIGS. 1-3 may include, for example, one or more of several exemplary devices of FIGS. 5A through 7. For example, and referring first to FIG. 5A, a motorized pumping device 264 includes a housing 201 that may be coupled directly to a tank wall (not shown) for example at an opening thereof, a pump assembly 203 carried in the housing 201 to extract, pressurize, and discharge liquid SCR reactant from the pumping device 264, and a motor 205 carried in the housing 201 to drive the pump assembly 203.

Figure 5A:
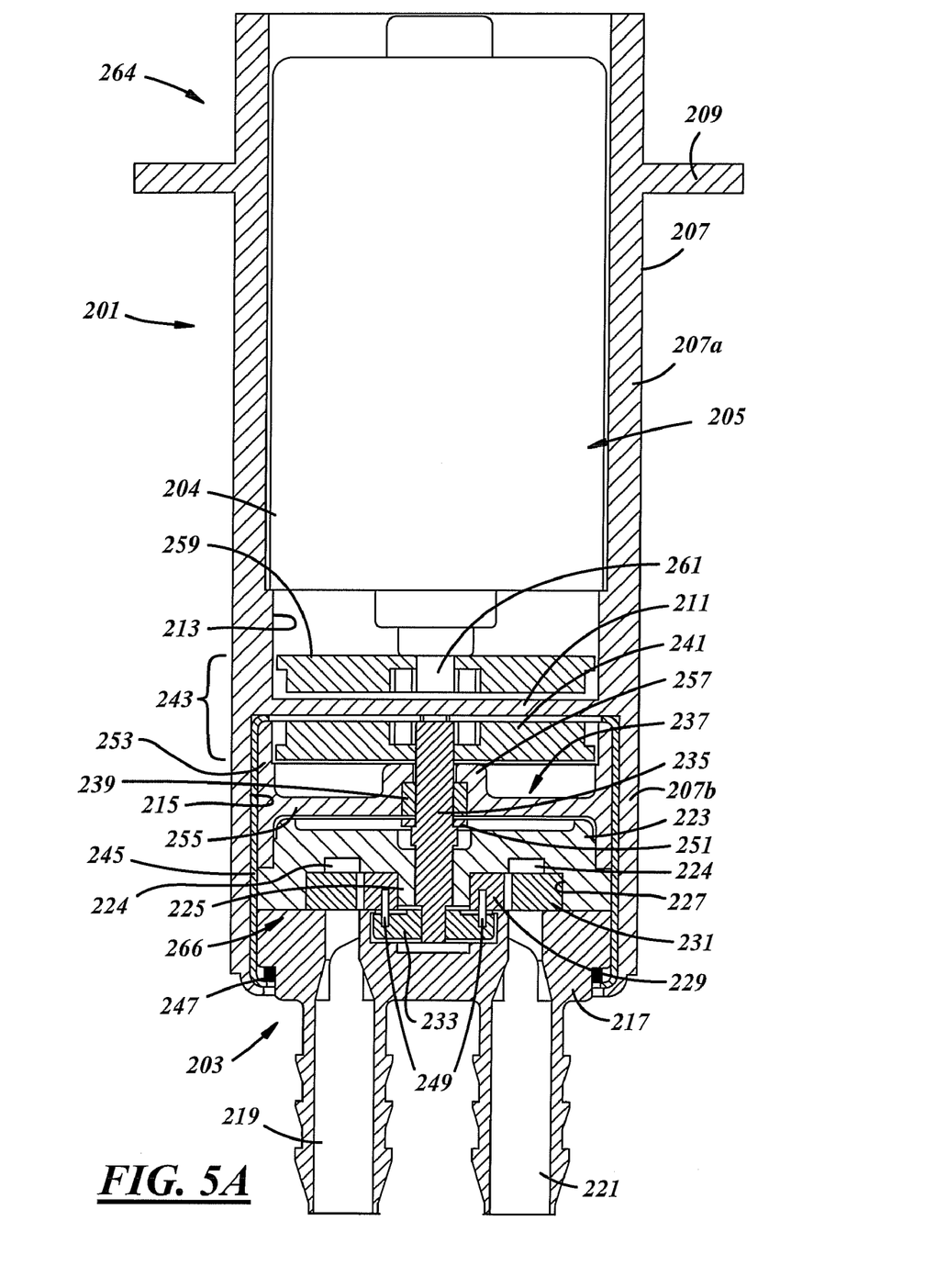
FIG. 5A is a cross-sectional view of an exemplary form of a motorized pumping device for use in the system of FIG. 1.

The housing 201 provides support for the pump assembly 203 and the motor 205, and may be of any appropriate construction and composition. For example, the housing 201 may include an outer wall 207 that may be generally cylindrical and may include a shoulder 204 that locates a lower end of the motor 205. The housing 201 may also include a mounting flange 209 that may extend generally transversely outwardly from the outer wall 207, and a dividing wall 211 that may extend generally transversely inwardly from the outer 207 wall to divide the interior of the housing 201 into a motor chamber 213 at least partially defined by a motor chamber wall 207a to support the motor 205 and a pump chamber 215 at least partially defined by a pump chamber wall 207b to support the pump assembly 203. The housing 201, or at least the dividing wall 211, may be composed of a nonmagnetic material. For example, the housing 201 may be composed of any suitable polymeric material, for example, polyamide or NYLON 6/6, or a stainless steel material that is sufficiently non-magnetic, for example austenitic or nickel containing stainless steel.

The pump assembly 203 may include a port housing or cover 217 including an inlet 219 and an outlet 221, and a pump 266 that may be of any appropriate type, for example, a turbine pump or a positive displacement pump such as a gear-rotor (or gerotor) type pump. The pump 266 may include a pump body 223 having a hub 225 and defining a rotor pocket 227, an inner or drive gear or rotor 229 disposed about the hub 225, and an outer or driven gear or ring or rotor 231 disposed in the rotor pocket 227. The drive rotor 229 and driven rotor 231 have meshed teeth which provide pumping chambers as they rotate. The drive rotor 229 is disposed at a lower end of the pump body 223 opposite of the center support 237. The pump assembly 203 may also include a drive coupling 233 coupled to the rotor 229, a shaft 235 coupled to the drive coupling 233, a center support 237 and a bearing 239 carried by the center support 237 to support the shaft 235 extending therethrough, and a driven member 241 of a magnetic disc coupling 243 coupled to the shaft 235. The pump assembly 203 may further include a case 245 that may be crimped over one end of the center support 237 and over another end of the cover 217 with a seal 247 therebetween.

The cover 217 supports the pump body 223 and rotors 229, 231 and defines an inlet and outlet path thereto and therefrom, and may be of any suitable construction and composition. For example, the cover 217 may be injection molded from polyphenylene sulfide (PPS) or compression molded from phenolic resin to include the barbed inlet 219 and barbed outlet 221. The cover 217 may include a flat face to cooperate with a rotor end of the stationary pump body 223 and with the rotating rotors 229, 231, and a pocket in the flat face to accommodate the drive coupling 233.

The cover 217, pump body 223, and rotors 229, 231 at least partially define an exemplary pump to pressurize the liquid SCR reactant, and may be of any appropriate construction and composition. For example, the components 223, 229, 231 may be formed from powdered or sintered metal, or the like. An inner diameter of the drive rotor 229 is piloted for rotation on the hub 225 of the body 223, and an outer diameter of the driven rotor 231 is supported for rotation within the rotor pocket 227 of the body 223. The pump body 223 may include a stepped outer surface to pilot the center support 237.

The drive coupling 233 couples the shaft 235 to the drive rotor 229, and may be of any suitable construction and composition, for example, machined steel. The drive coupling 233 may include drive dogs 249, for example, pins, that may be separate or integral and extend into corresponding recesses or bores in the drive rotor 229, and an inner diameter that may be coupled to the shaft 235 via corresponding flats, splines, or the like.

The shaft 235 couples the magnetic coupling 243 to the pump drive rotor 229, and may be of any appropriate construction and composition, for example, machined steel. The shaft 235 may include a pump end coupled to the drive coupling 233, for example, via spline connection, press fit, or the like. The shaft 235 also may include a shoulder to axially locate a thrust bearing member 251, which is carried by the shaft 235 to axially support the shaft 235 and protect the pump against axial forces on the shaft 235 induced by the magnetic attractive forces on the driven member 241. The thrust bearing member 251 may be a ring, clip, washer, or the like and may be composed of stainless steel. The shaft 235 also includes one or more bearing diameters supported by the hub 225 of the pump body 223 and/or the bearing 239 of the center support 237, and a coupling end that may be coupled in any suitable manner to the magnetic driven member 241, for example by a set screw (not shown), a spline connection, or the like.

The center support 237 provides axial support for the pump body 223 and radial support for the shaft 235, and may be of any appropriate construction and composition. For example, the center support 237 may be plastic, for example, a phenolic resin of any suitable type. The center support 237 may include an outer wall 253 that may be generally cylindrical and piloted to the stepped outer surface of the pump body 223, and a wall 255 extending generally transversely from the outer wall 253 and including a hub 257 defining a bearing pocket to accept the bearing 239 therein. The bearing 239 may be a bushing, which may be composed of carbon, a roller bearing, which may be composed of stainless steel, needle bearing, or any other suitable device to support the rotating shaft.

The driven member 241 of the magnetic coupling 243 responds to rotation of a drive member 259 of the magnetic coupling 243, and may be of any appropriate construction and composition. For example, the magnetic coupling members 241, 259 each may be one half of the magnetic disc coupling 243. The coupling members 241, 259 may be constructed and composed of one or more rare-earth magnets hermetically sealed in a stainless steel housing, or overmolded with phenolic or polyphenylene sulfide (PPS) resin. The magnets may be composed, for example, of neodymium, iron, and boron ($Nd_2Fe_{14}B$). In another example, the coupling members 241, 259 may be commercially available from Magnetic Technologies, Ltd. of Oxford, Mass. An exemplary coupling is an MTD-0.2 ASSY having 0.2 Nm of slip torque and constructed with an aluminum cover and six magnets. Accordingly, the driven member 241 may be the same or similar to the drive member 259, which is coupled to the motor 205 in any suitable manner.

The motor 205 provides an exemplary prime mover to drive the pump drive rotor 229 and, thus, the driven rotor 231, and may be of any appropriate construction and composition. For example, the motor 205 may provide about 30 m-Nm of torque at 13 Volts and 1.6 Amps at about 4,500 RPM, and may be an HC series motor available from Johnson Electric Industrial Manufactory Ltd., of Hong Kong. The motor 205 includes an output shaft 261 that may be coupled in any suitable manner to the magnetic drive member 259, for example by a set screw (not shown), a spline connection, or the like.

In operation, the motor 205 is energized with electrical power so as to rotate its drive shaft 261. Because of the mechanical connection therebetween, rotation of the shaft 261 causes the drive member 259 of the magnetic coupling 243 to rotate. Because of the magnetic attraction therebetween, and through the dividing wall 211, rotation of the magnetic drive member 259 causes the driven member 241 to rotate. Because of the mechanical connection therebetween, rotation of the driven member 241 causes the shaft 235 to rotate, thereby causing the drive rotor 229 and driven rotor 231 to rotate by way of the drive coupling 233 mechanically connected therebetween. Accordingly, operation of the motor 205 causes operation of the pump 266 through the wall 211 disposed therebetween.

The wall 211 isolates the motor chamber from the pump chamber so that corrosive liquid SCR reactant from the pump chamber cannot enter the motor chamber. The magnetic coupling 243 permits the energized motor drive shaft to rotate even when the pump shaft does not rotate, for example, when frozen SCR reactant is in the pump, thereby avoiding damage to both the motor and the pump.

Figure 5C:
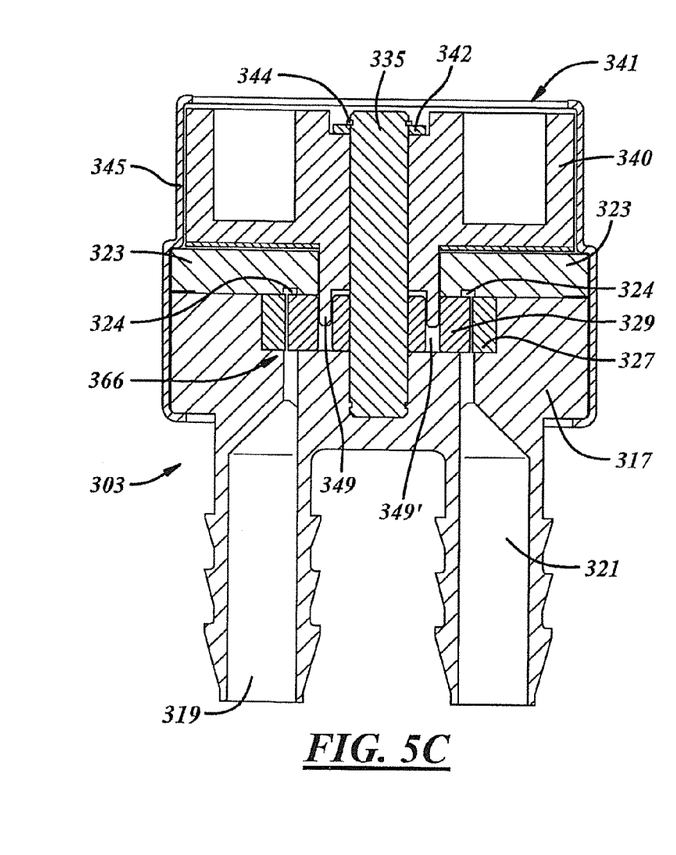
FIG. 5C is an enlarged cross-sectional view of a portion of the motorized pumping device of FIG. 5B.

FIGS. 5B and 5C, illustrate another exemplary form of a motorized pumping device 364 that is similar in many respects to the form of FIG. 5A and like numerals between the forms generally designate like or corresponding elements throughout the several views of the drawing figures. Accordingly, the descriptions of the pumping devices 264, 364 are incorporated by reference into one another in their entireties.

Additionally, the description of the common subject matter generally may not be repeated here.

The motorized pumping device 364 includes a housing 301 that may be coupled directly to a tank wall (not shown) for example at an opening thereof, a pump assembly 303 carried in the housing 301 to extract, pressurize, and discharge liquid SCR reactant from the pumping device 364, and an electric motor 305 carried in the housing 301 to drive the pump assembly 303.

The housing 301 includes an outer wall 307 including a shoulder 304 that locates a lower end of the motor 305, a dividing wall 311 extending inwardly from the outer wall 307, a flange 309 extending in generally transverse direction from the outer wall 307, and one or more barbs 308 therebetween. The barbs 308 enable insertion of the housing 301 into an aperture in a tank wall (not shown) until the flange 309 abuts the tank wall and thereafter the barbs 308 resist removal of the housing 301 from the tank wall.

The pump assembly 303 may include a pump body 317 including an inlet 319 and an outlet 321 and defining a rotor pocket 327, and a pump 366. The pump 366 may include a pump port plate 323, which may define one or more pump ports 324 and may be disposed against the body 317. The pump 366 may also include a driven rotor 331 disposed in the rotor pocket 327 and a drive rotor 329 disposed in the driven rotor 331, both of which may be sandwiched between the body 317 and the port plate 323. The drive rotor 329 may also be supported on a stationary shaft 335, which may be fixed to the body 317 in a corresponding pocket or blind bore in the body 317 at one end and may be coupled to a driven member 341 of a magnetic coupling 343 at another end.

The driven member 341 may be rotatably received on the shaft 335 and retained, for example, by a thrust washer 342 and a clip 344. The clip 344 is engaged to the shaft 335 in any appropriate manner, for example, by being disposed in corresponding groove thereof. The thrust washer 342 may be disposed in a pocket in a housing portion 340 of the driven member 341 and between the clip 344 and a shoulder of the housing portion 340 of the driven member 341. The thrust washer 342 may axially restrain the driven member 341 to avoid interference between the driven member 341 and the dividing wall 311 of the housing 301 or a case 345. The thrust washer 342 and clip 344 may be composed of stainless steel. The driven member 341 may include an integral drive coupling 333, which may include one or more drive dogs 349 may slip fit into one or more corresponding pockets or blind holes 349' in the drive rotor 329. The integral drive coupling 333 may be loosely fit for rotation within an inner diameter of the plate 323.

The pump assembly 303 may further include the case 345, which may be machined or drawn from stainless steel and may be crimped at one end with clearance over the driven coupling 341 for a loose fit therebetween, and crimped at another end over the body 317 with an interference or tight fit therebetween. The case 345 tightly conforms to the body 317 and plate 323 in close contact therewith. In contrast, the case 345 loosely corresponds to the driven coupling 341 to permit the driven coupling 341 to freely rotate without interference from the case 345. The distance between the crimp relative to a shoulder in the case 345 may be set such that there is at least a slight axial gap between the driven coupling 341 and the port plate 323 to avoid interference therebetween.

The motor 305 includes an output shaft 361 that may be coupled in any suitable manner to a magnetic drive member 359 of the magnetic coupling 343, for example by press fit, and/or by a washer 360 and a clip 362. The clip 362 is engaged to the shaft 361 in any appropriate manner, for example, by being disposed in a corresponding groove thereof. The washer 360 may be disposed in a pocket in a housing portion 358 of the drive member 359 and between the clip 362 and a shoulder of the housing portion 358 of the drive member 359. The washer 360 may axially restrain the drive member 359 to avoid contact between the drive member 359 and the dividing wall 311 of the housing 301.

In operation, the motor 305 is energized with electrical power so as to rotate the shaft 361. Because of the mechanical connection therebetween, rotation of the shaft 361 causes the drive member 359 of the magnetic coupling 343 to rotate. Because of the magnetic attraction therebetween, rotation of the magnetic drive member 359 causes the driven member 341 to rotate about the stationary shaft 335 and within the case 345. Because of the mechanical connection therebetween, rotation of the driven member 341 causes the drive rotor 329 to rotate. Accordingly, operation of the motor 305 causes operation of the pump 366 through the wall 311 disposed therebetween.

Figure 6A:
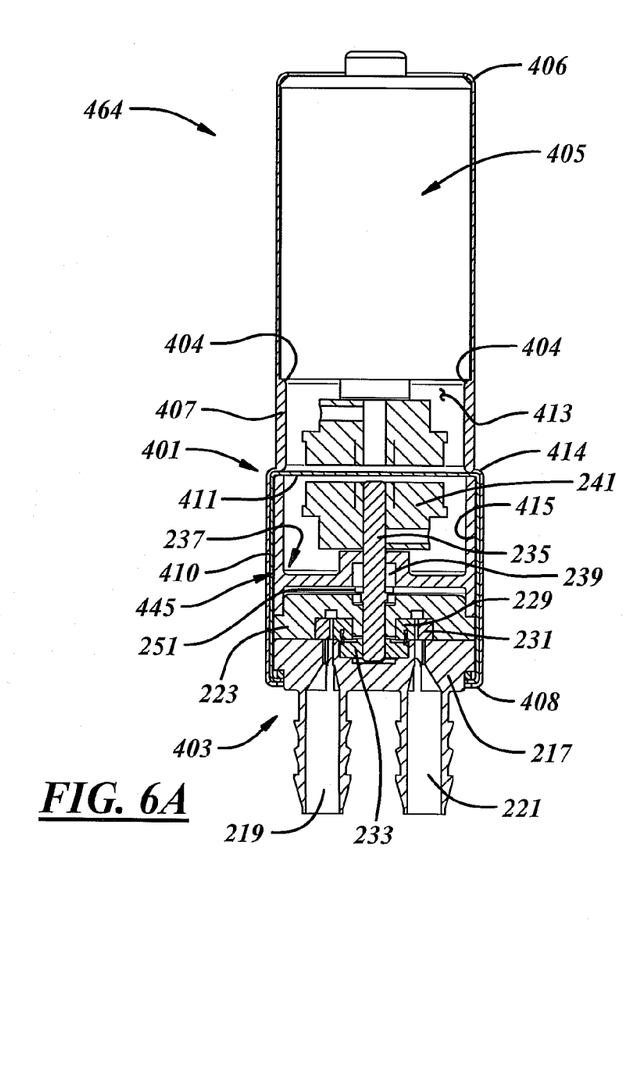
FIG. 6A is a cross-sectional view of an additional exemplary form of a motorized pumping device for use in the system of FIG. 1.

FIG. 6A illustrates another exemplary form of a motorized pumping device 464 that is similar in many respects to the form of FIGS. 5A-5C and like numerals between the forms generally designate like or corresponding elements throughout the several views of the drawing figures. Accordingly, the descriptions of the pumping devices 264, 364, 464 are incorporated by reference into one another in their entireties. Additionally, the description of the common subject matter generally may not be repeated here.

The pumping device 464 includes a housing 401, an electric motor 405 carried in the housing 401, and a pump assembly 403 carried in the housing 401. The housing 401 may be machined or formed from metal in any appropriate manner, for example, by rolling, flow forming, or the like. The housing 401 may be composed of a zinc-plated stainless steel, galvanized steel, or any other suitable metal.

The housing 401 may be of generally cylindrical shape and may include a motor section defining a motor chamber 413, a pump section defining a pump chamber 415, and an external step or shoulder 414 therebetween. The motor section of the housing 401 may include a crimped end 406 that is crimped around an upper end of the motor 405, and a thickened wall portion 407 having a shoulder 404 that locates a lower end of the motor 405. The pump section of the housing 401 may include a crimped end 408 that is crimped around a lower end of the pump assembly 403.

The pump assembly 403 includes a case 445 with an outer wall 410 and a dividing wall 411 extending transversely inwardly from the outer wall 410 at an upper end of the pump assembly 403. The pump assembly 403 may be disposed in the pump chamber 415 of the housing 401 so that the dividing wall 411 axially locates against the shoulder 414.

Figure 6B:
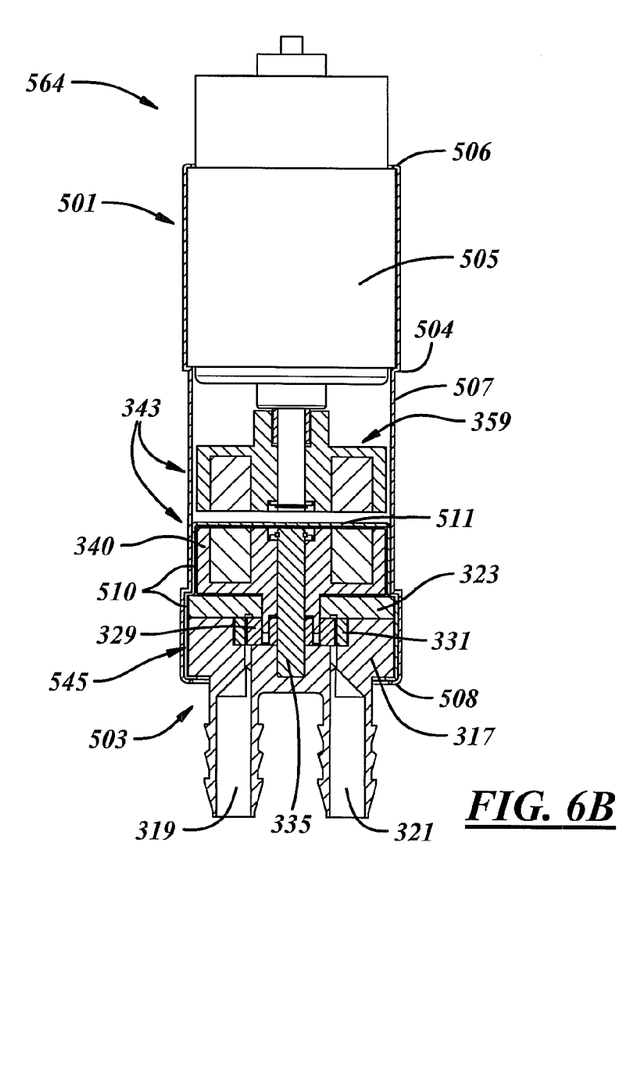
FIG. 6B is a cross-sectional view of a further exemplary form of a motorized pumping device for use in the system of FIG. 1.

FIG. 6B illustrates another exemplary form of a motorized pumping device 564 that is similar in many respects to the form of FIGS. 5A through 6A and like numerals between the forms generally designate like or corresponding elements throughout the several views of the drawing figures. Accordingly, the descriptions of the pumping devices 264, 364, 464, 564 are incorporated by reference into one another in their entireties. Additionally, the description of the common subject matter generally may not be repeated here.

The pumping device 564 includes a housing 501, a motor 505 carried in the housing 501, and a pump assembly 503 carried in the housing 501. The housing 501 may include an outer wall 507 defining a motor section including a crimped end 506 that is crimped around an upper end of the motor 505 and a shoulder 504 that locates a lower end of the motor 505, and also defining a pump section that may include a crimped end 508 that is crimped around a lower end of the pump assembly 503.

The pump assembly 503 includes a case 545 that includes an outer wall 510 and a dividing wall 511 extending transversely inwardly from the outer wall 510 at an upper end of the pump assembly 503. The dividing wall 511 may divide the interior of the housing 501 into a motor chamber in which the motor 505 and drive member 359 is disposed, and a pump chamber in which the rest of the pump assembly 503 is disposed.

Figure 7:
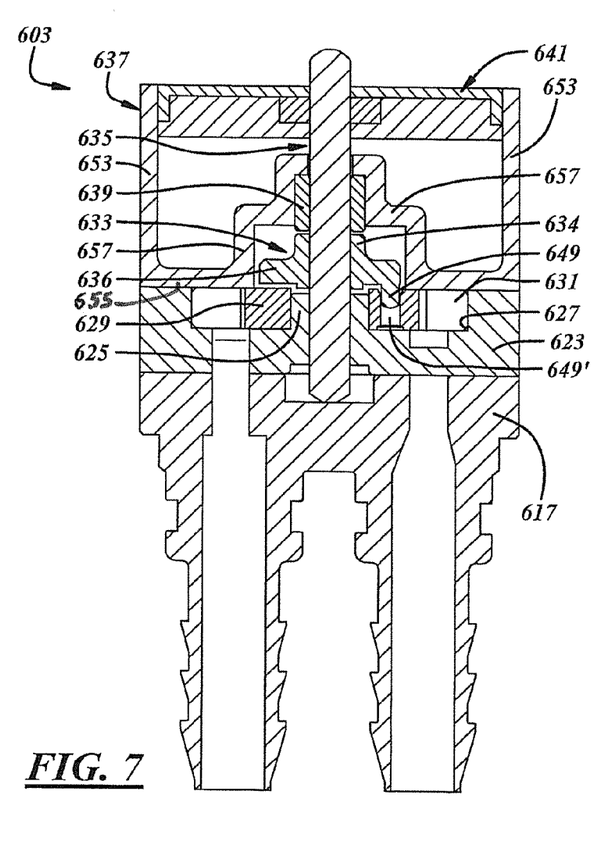
FIG. 7 is a cross-sectional view of a portion of an exemplary form of a motorized pumping device for use in the system of FIG. 1.

FIG. 7 illustrates another exemplary form of a pump assembly 603 that is similar in many respects to the forms of FIGS. 5A through 6B and like numerals between the forms generally designate like or corresponding elements throughout the several views of the drawing figures. Accordingly, the descriptions of the pump assemblies 203, 303, 403, 503 are incorporated by reference into one another in their entireties. Additionally, the description of the common subject matter generally may not be repeated here.

The pump assembly 603 may include a cover 617, and a pump including a pump body 623 having a hub 625 and defining a rotor pocket 627, a drive rotor 629 disposed about the hub 625, and a driven rotor 631 disposed in the rotor pocket 627. The drive rotor 629 is disposed at an upper end of the pump body 623 between the center support 637 and the pump body 623. The pump assembly 603 may also include a drive coupling 633 coupled to the drive rotor 629, a shaft 635 connected to the drive coupling 633, a center support 637 and a bearing 639 carried by the center support 637 to support the shaft 635 extending therethrough, and a driven member 641 of a magnetic coupling coupled to the shaft 635. The pump assembly 603 may further include a case (not shown).

The cover 617 may be injection molded from an acetal resin and may include a flat face to cooperate with a lower end of the stationary pump body, and a pocket in the flat face to accommodate an end of the shaft 635.

An inner diameter of the drive rotor 629 is piloted for rotation on a hub 625 of the body 623, and an outer diameter of the driven rotor 631 is supported for rotation within the rotor pocket 627 of the body 623.

The drive coupling 633 may include an integral thrust bearing member or hub 634, a flange 636 extending transversely from the hub 634, and drive dogs 649 extending longitudinally from the flange 636 that extend into corresponding pockets or blind bores 649' in the drive rotor 629. The hub 634 is engageable with the bearing 639 to axially support the shaft 635 and protect the pump against axial forces on the shaft 635 induced by the magnetic attractive forces on the driven member 641. The drive coupling 633 may include an internal diameter splined for coupling to the shaft 635, or may be press fit to a corresponding knurled portion of the shaft 635, or otherwise fixed to the shaft 635.

The shaft 635 may be of substantially solid cylindrical shape and includes one or more bearing diameters supported by the pump body 623 and/or the center support 637.

The center support 637 may be of any suitable construction and composition and, for example, may include an outer wall 653 that may be generally cylindrical, and a wall 655 extending generally transversely from the outer wall 653 and including a stepped hub 657 defining a drive coupling pocket to accept the drive coupling 633 therein and a bearing pocket to accept the bearing 639 therein. The bearing 639 may extend longitudinally into the drive coupling pocket wherein a lower end of the bearing 639 may be configured for contact with the rotating drive coupling 633. As such, the bearing may function as both a radial bushing and thrust bearing. The bearing 639 may be composed of carbon, PPS or any other suitable material.

Figure 8:
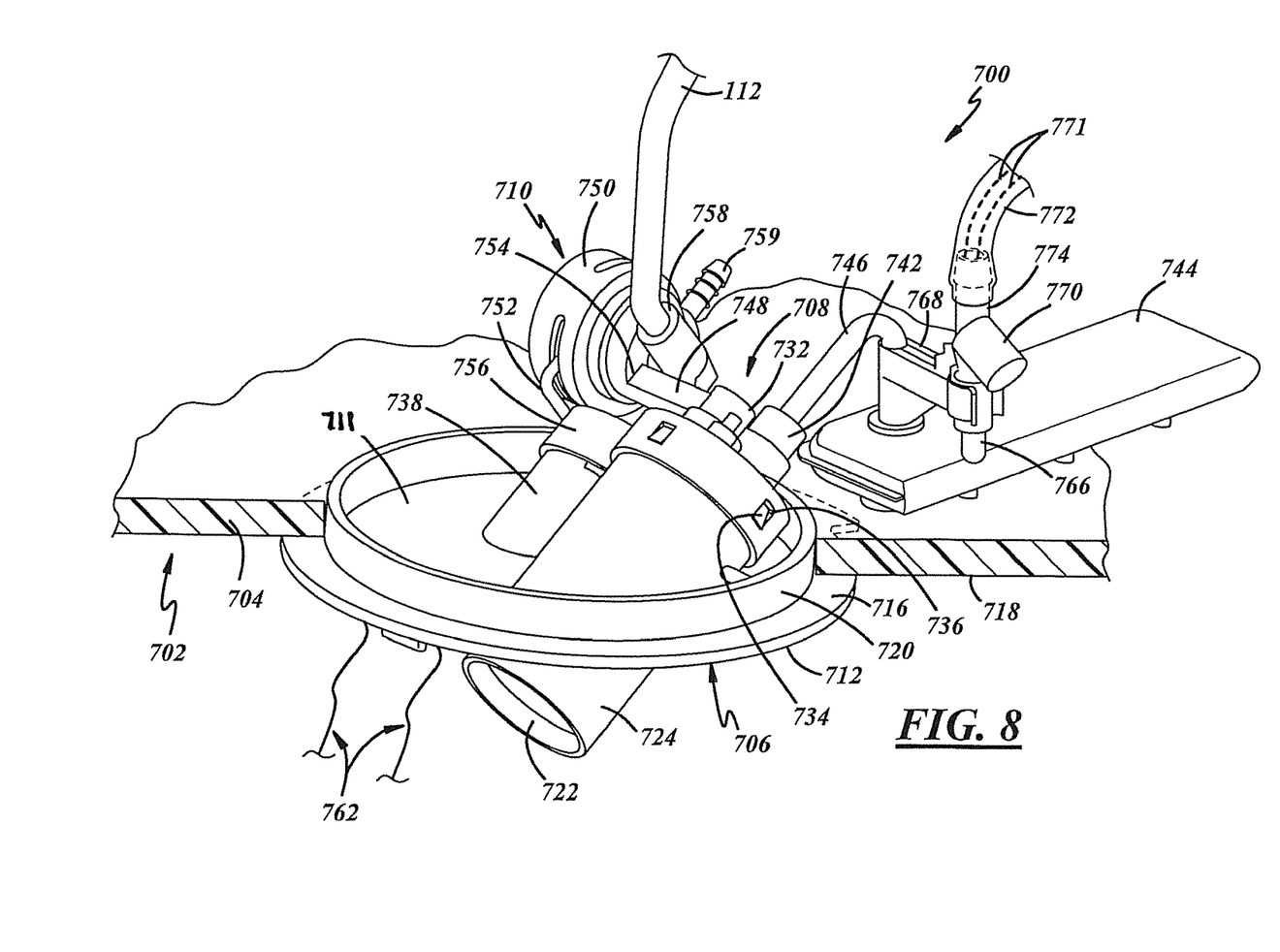
FIG. 8 is a perspective view of an exemplary reactant delivery module.
Figures 9, 10:
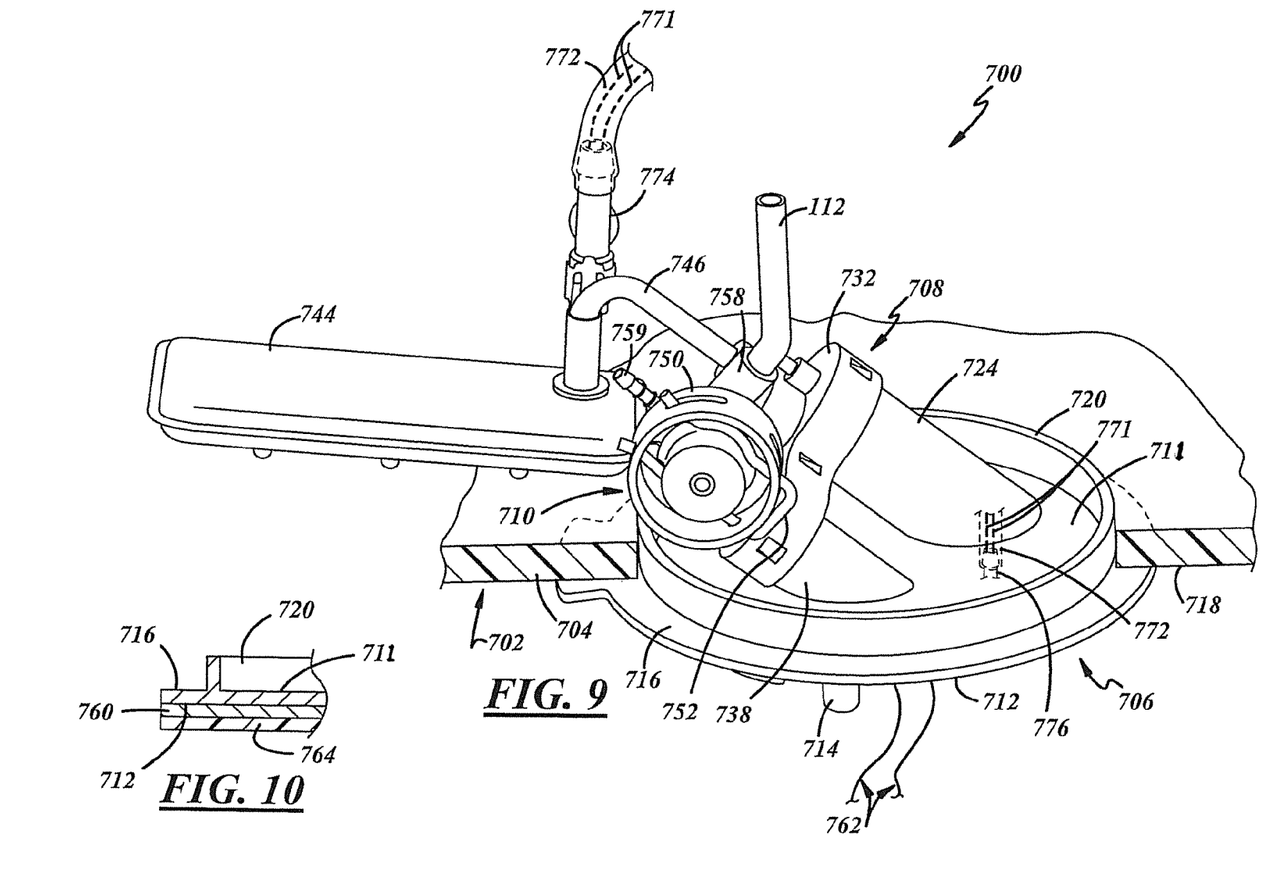
FIG. 9 is another perspective view of the reactant delivery module of FIG. 8.
FIG. 10 is a fragmentary sectional view of a portion of a mounting flange of the module.

As shown in FIGS. 8 and 9, a reactant delivery module 700 may be carried other than by the top or an upper wall of a storage tank 702. In this example, the reactant delivery module 700 is constructed and arranged to be carried by or mounted to a lower wall 704 of the storage tank 702. The module 700 may include, among other things, a mounting flange 706, a reactant delivery device 708, and a pressure regulator 710.

The reactant delivery device 708, or pressurizing device, may be any suitable device capable of moving a desired amount or rate of the reactant from the storage tank and may include, but is not limited to, the various devices set forth herein. In that regard, the device 708 may include a pump that may be magnetically driven with a motor separated from but magnetically communicated with the pump.

The pressure regulator 710 may likewise be any suitable device to control the pressure of fluid discharged from the storage tank 702. As shown in FIGS. 8 and 9, the pressure regulator 710 may be a flow-through type regulator having a pressure regulating valve (not shown) disposed between an inlet, outlet and a bypass outlet. Fluid discharged from the pump enters the inlet of the regulator 710 and fluid at or below a threshold pressure passes through the regulator 710 and out of the outlet for delivery through the flange 706 and from the storage tank 702. Fluid above the threshold pressure is discharged through the bypass passage and back into the storage tank 702. The bypass passage may communicate with the conduit 112, as set forth above. A representative fuel pressure regulator 710 is disclosed in U.S. Pat. No. 5,265,644, the disclosure of which is incorporated herein by reference in its entirety. Of course, other pressure regulating or pressure relief devices may be used.

The mounting flange 706 may include an inner surface 711 at least partially exposed to the interior of the storage tank 702, an outer surface 712 opposite the inner surface 711 and outside of the storage tank, and an outlet 714 (FIG. 9) passing through the flange 706 to permit fluid flow out of the storage tank through the flange. The mounting flange 706 may further include one or more sealing surfaces adapted to be sealingly coupled to the storage tank. The sealing surfaces may include a radially outwardly extending rim 716 adapted to overlie and be sealed to an outside surface 718 of the storage tank wall 704, and/or an axially extending and circumferentially continuous wall 720 that may be spaced radially inwardly from the outer periphery of the rim 716 and adapted to be received within and/or sealed to an opening in the storage tank 702. To hold the reactant delivery device 708 and pressure regulator 710 in desired positions relative to the flange 706 and within the storage tank 702, the flange 706 may include retention features for one or both of these devices.

The retention feature for the reactant delivery device 708 may be formed or carried on the flange 706, or it may be separate from the flange. The retention feature may include one or more cavities, fasteners, rods, skirts, flanges or other features on or to which the reactant delivery device 708 may be coupled or carried. In the implementation shown, the retention feature includes one or more generally cylindrical cavities 722 (FIG. 8) in which portions of the reactant delivery device 708 are carried. The cavities may be defined by one or more skirts or cylindrical walls 724 extending from one or both of the inner and outer surfaces 710, 712 of the flange 706. A dividing wall may separate a motor portion of the cavity 722 from a pump portion of the cavity 722 yet permit magnetic communication between them as previously set forth herein. The dividing wall may be formed in one-piece with the flange 706, or formed separately therefrom, and disposed within the cavity 722. The cavity 722 may be open at both ends to permit insertion of the components of the reactant delivery device 708 from each end of the cavity 722. The reactant delivery device 708 may be received partially or entirely within the cavity 722 and retained therein by an end cap 732. To this end, the wall 724 may have various retention features, such as angled tabs 734, that are received in complementary slots or openings 736 in the end cap 732 that permit snap-fit retention of the end cap 732 on the wall 724 to retain the reactant delivery device 708 within the cavity 722.

The retention feature for the pressure regulator 710 may include a projecting wall 738 which may be tubular and define an internal cavity or passage through which fluid may flow. The cavity or passage may lead to the flange outlet 714 so that pressurized fluid that flows out of the pressure regulator 710 outlet flows through the flange outlet 714 for delivery downstream of the storage tank 702. All or a portion of the pressure regulator 710 may be disposed within the cavity or passage defined by the wall 738, or the regulator 710 may be simply carried by or coupled to the wall 738.

In the implementation shown, the end cap 732 that retains the reactant delivery device 708 may include an inlet 742 (FIG. 8) that is coupled to a filter 744 to provide a filtered supply of fluid (in this example, the fluid is the reactant) to the pump, such as through an inlet tube 746 extending between the filter 744 and inlet 742. Of course, the filter 744 could be carried by the end cap 732 without any intermediate tube 746. The end cap 732 may also include or define an outlet 748 through which fluid discharged from the reactant delivery device 708 flows.

The pressure regulator 710 may be carried by a housing 750 that may be coupled to the end cap 732. The housing 750 may include a cavity (not shown) in which the pressure regulator 710 is received and a clip 752 may be used to retain the pressure regulator 710 within the cavity. An inlet 754 of the housing 750 may be communicated with the pressure regulator inlet, an outlet 756 of the housing 750 may be communicated with the pressure regulator outlet, and one or more bypass outlets 758, 759 (two are shown in the illustrated embodiment) of the housing 750 may be communicated with the bypass outlet of the pressure regulator 710. In this way, the flow of bypassed fluid could be bifurcated to provide two or more separate streams of bypassed fluid which may be routed to different areas of the storage tank 702, if desired, to improve distributed melting of the reactant. The outlet 756 of the housing 750 may be arranged to be sealingly connected to the flange wall 738 to provide fluid flow from the pressure regulator outlet to the flange outlet 714 for delivery from the storage tank 702.

In the implementation shown, the outlet 748 of the end cap 732 is coupled to the inlet 754 of the housing 750 which leads to the inlet of the pressure regulator 710 to provide pressurized fluid from the reactant delivery device 708 to the inlet of the pressure regulator 710. The housing 750 and end cap 732 may be formed in one-piece such as by injection molding or other process. This may enable separate fluid lines between the pressurizing device 708 and pressure regulator 710 to be eliminated, which also eliminates the need to ensure sealed connections of such fluid lines.

As discussed above, one or more heaters may be provided to melt frozen reactant within the storage tank 702. In one implementation, the heater may include forming the flange 706 out of a metallic material and applying electrical energy to or otherwise heating the flange 706. With the flange 706 disposed at or near the bottom of the storage tank 702, reactant will be in contact with the flange 706, and when frozen, will be melted by the heated flange. To improve the flange heating, an or more than one electrically conductive coating 760 (FIG. 10) may be applied to the outside surface 712 of the flange 706, and an electrical connection may be coupled to the coating 760 to provide electricity to the coating and flange 706. The coating may be applied and/or cover all or less than all of the outer surface 712 of the flange 706. The electrical connection may be any suitable means or device to apply power to the flange and/or its coating(s). For example, the electrical connection may be a connector to which wires 762 are connected, or the electrical connection may include connecting the wires 762 (e.g. by soldering) directly to the flange and/or its coatings without any separate connector. The coating 760 may be applied as a liquid, sheet, foil, or in any other suitable form. In one form, the coating 760 may be a metallic ink that is sprayed or otherwise applied to the flange and allowed to dry or cure so that it is adhered or bonded to the flange. A wide range of materials may be used as the coating. A second coating 764 (FIG. 10), which may be a potting material, may be applied over the first coating 760 to protect the first coating and insulate the flange and coating(s) 760.

Electrical power may be applied to the flange 706 and/or coating 760 in a controlled manner to provide a desired temperature or temperature increase of the flange 706. In one implementation, between about 100 to 150 watts may be applied to the flange 706 and/or coating 760. A watt density of between about 0.1 to 1 watt/mm$^2$ across the surface of the flange 706 may be desirable in at least certain applications. Too high of a watt density may melt the reactant from the bottom of the storage tank 702 toward the top in a relatively straight, vertical pattern without much sideways dispersion of the melting (e.g. like a cylinder). Too low of a heat density may not sufficiently melt the reactant, may cause too much sideways dispersion of the melt pattern and not enough melting progress vertically (e.g. toward an upper wall of the storage tank) in the frozen reactant. As noted above with regard to other implementations of the heater, the surface temperature of the flange 706 in at least some implementations may be controlled to not exceed about 80° C., although other temperature thresholds or ranges could be used as desired.

The temperature of the flange 706 may be controlled by use of a thermister 766 (FIG. 8), and a representative thermister 766 is carried by a clip 768 in the area of the filter 744 and flange 706. Additionally, a low reactant level sensor 770 may be provided at a desired height or level in the area of the bottom of the storage tank 702, and is shown as being carried by the clip 768 and part of a unit with the thermister 766. The low level sensor 770 may include spaced apart electrical leads that are electrically coupled together when both are in contact with an electrically conductive fluid, like urea. In the absence of the fluid contacting both leads, the sensor 770 provides a signal indicative that there is a low level of reactant within the storage tank 702. Wires 771 for the thermister 766 and level sensor 770 may be provided through a conduit 772 that may be sealingly received on a fitting 774 to provide a sealed connection of the wires within the storage tank 702. The conduit 772 may extend to a similar fitting 776 (FIG. 9) on the flange 706 to permit the wires 771 to pass through the flange 706 and out of the storage tank 702.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A reactant delivery system for engine exhaust gas treatment, comprising:
 a tank in which a reactant is received;
 a pumping device having an inlet disposed within the interior of the tank to receive the reactant, and an outlet through which the reactant is discharged;
 a pressure relief device having an inlet in fluid communication with the outlet of the pumping device, a primary outlet to discharge the reactant under pressure to a downstream location, and a bypass outlet through which at least some of the reactant discharged from the pumping device is selectively discharged;
 a reactant distribution device in fluid communication with the bypass outlet of the pressure relief device and having a plurality of outlets to distribute the reactant to at least two different locations within the tank;
 an absorbent filter coupled to the inlet of the pumping device to absorb and filter reactant for delivery to the pumping device; and
 a heater extending adjacent the pumping device and the absorbent filter.

2. The system of claim 1 wherein the pressure relief device permits flow through the bypass outlet of the reactant when the pressure of the reactant at the pressure relief device is above a threshold.

3. The system of claim 1 wherein the distribution device includes a flexible conduit arranged in a non-linear fashion within the tank with at least two outlets oriented in different directions within the tank.

4. The system of claim 3 wherein the conduit includes a plurality of apertures spaced apart along its length.

5. The system of claim 4 wherein the apertures are positioned and directed so as to selectively distribute liquid reactant in three planes.

6. The system of claim 5 wherein at least one aperture is located in the area of the pumping device to distribute liquid reactant in the area of the pumping device.

7. The system of claim 3 wherein the total flow area through the apertures for a given length of the conduit increases as the distance from the pressure relief device increases to achieve relatively consistent flow delivered by the conduit along its length.

8. The system of claim 1 including a plurality of heaters distributed within the tank at least partially around the pumping device and filter, and including heating elements encapsulated in phase-change material that is separate from the reactant.

9. A reactant delivery system for engine exhaust gas treatment, comprising:
 a tank in which a reactant is received;
 a pumping device having an inlet disposed within the interior of the tank to receive the reactant, and an outlet through which the reactant is discharged;
 a reactant distribution device in fluid communication with reactant after the reactant is discharged from the pumping device outlet, where the reactant distribution device has at least one outlet to distribute the reactant within the tank;
 a filter coupled to the inlet of the pumping device to filter the reactant; and
 a heater disposed adjacent to both the filter and the inlet of the pumping device to melt frozen reactant in or adjacent to the filter or inlet of the pumping device.

10. The system of claim 9 wherein the heater is encapsulated in a phase-change material that is different from the reactant and disposed within a housing within the tank.

* * * * *